(12) United States Patent
Ruark et al.

(10) Patent No.: US 8,324,136 B1
(45) Date of Patent: Dec. 4, 2012

(54) SYNERGISTIC BEAD LUBRICANT AND METHODS FOR PROVIDING IMPROVED LUBRICATION TO DRILLING FLUIDS FOR HORIZONTAL DRILLING

(75) Inventors: Gregory A. Ruark, Mustang, OK (US); Robert W. Pike, Houston, TX (US)

(73) Assignee: Grinding & Sizing Company LLC, Houston, TX (US)

( * ) Notice: Subject to any disclaimer, the term of this patent is extended or adjusted under 35 U.S.C. 154(b) by 0 days.

(21) Appl. No.: 12/930,420

(22) Filed: Jan. 6, 2011

Related U.S. Application Data

(60) Provisional application No. 61/335,397, filed on Jan. 6, 2010.

(51) Int. Cl.
*C09K 8/05* (2006.01)

(52) U.S. Cl. ........ 507/117; 507/136; 507/138; 507/140; 166/293

(58) Field of Classification Search .................. 507/100, 507/103, 117, 118, 125, 140, 901, 904, 906; 175/57, 65
See application file for complete search history.

(56) References Cited

U.S. PATENT DOCUMENTS 4,063,603 A * 12/1977 Rayborn ........................ 175/65
2008/0167203 A1 * 7/2008 Bradbury et al. ............. 507/116

* cited by examiner

*Primary Examiner* — John J Figueroa
(74) *Attorney, Agent, or Firm* — Karen Bryant Tripp

(57) ABSTRACT

A drilling fluid lubricant and method for drilling using same comprising a blend of beads having varying densities such that the beads provide lubricity at both the top and bottom portions of a horizontal drill string during horizontal, directional, or expanded extended reach drilling.

18 Claims, No Drawings

SYNERGISTIC BEAD LUBRICANT AND METHODS FOR PROVIDING IMPROVED LUBRICATION TO DRILLING FLUIDS FOR HORIZONTAL DRILLING

RELATED PATENT APPLICATION

This patent application claims priority from U.S. Provisional Patent Application No. 61/335,397 filed Jan. 6, 2010, which is now no longer pending and is considered abandoned.

FIELD OF THE INVENTION

The present invention generally relates to lubricants for drilling fluids and methods for providing lubrication to drilling fluids. More particularly, the invention relates to such methods and lubricants employing beads.

BACKGROUND OF THE INVENTION

The following paragraphs contain some discussion, which is illuminated by the innovations disclosed in this application, and any discussion of actual or proposed or possible approaches in this Background section does not imply that those approaches are prior art.

Mechanical friction during drilling operations is a known problem which is enhanced in long narrow, highly inclined, directional, and "horizontal," boreholes. A directional well is typically drilled to position a reservoir entry point. Directional wells are initially drilled straight down to a predetermined depth and then gradually curved at one or more different points to penetrate one or more given target reservoirs. A horizontal well is commonly defined as any well in which the lower part of the well bore parallels the oil zone. Horizontal drilling allows a single wellbore at the surface to penetrate oil or gas-bearing reservoir strata at horizontal or near horizontal angles to the dip of the strata. The angle of inclination used to drill the well does not have to reach 90° for the well to be considered a "horizontal" well. Horizontal drilling has become one of the most common and popular forms of drilling for recovery of hydrocarbons from subterranean formations used today. Extended-Reach Drilling has evolved from simple directional drilling to horizontal, lateral, and multi-lateral step-outs. Since extended-reach drilling employs both directional and horizontal drilling techniques, the utility of the present invention is applicable to extended-reach drilling as well.

Friction reducers are typically either liquids or solid particles. Liquids form a film between two surfaces minimizing contact and consequently friction. Liquid additives include among others glycol, oil, ester, and fatty acid ester-based lubricants. The efficiency of such liquids as friction reducers depends heavily on the type of drilling fluid in which the liquids are used. The effectiveness of liquids may be lost altogether in high-solids drilling fluids.

Solid particles are less dependent on the type of drilling fluid used and various forms have been used. One example of a solid lubricant is glass beads, which were originally thought to act like small ball bearings downhole. Later, the beads were considered by some to slide instead of act like a ball bearing, but in either event, the beads were found to reduce friction. Another example of a solid lubricant is polymer beads, which, like glass beads, form a slippery lubricant between the borehole and the drill string. Still another similar example is plastic beads.

As used herein, the term "beads," includes, besides preferably spherical particles, rotational elliptic particles, egg shaped particles, e.g., particles which are rotationally symmetric to one axis, droplet shaped particles, pellets, and also less symmetrical particles like spheres with protrusions. Most preferably, the beads are in the shape of substantially perfect spheres.

The size of beads has been considered important, as larger beads (for example, greater than about 75 μm) tend to be filtered out in solids control equipment. On the other hand, fine beads (for example, about 44-88 μm) pass most shale shaker screens but tend to be removed by desilters. Generally, a size in the range of about 40 to 60 mesh is considered most preferred. Beads typically have a density comparable to the desired density of the drilling fluid, or may have a lower density to lighten the fluid column.

With more and more drilling for the recovery of hydrocarbons involving or including horizontal drilling, the use of beads as lubricants has shown the problem of gravity migration and settling of beads on the lower side of the borehole. However, beads also reduce drill pipe and casing wear in high angle directional and horizontal wells by preventing metal to metal contact. The beads form a layer or sheath between such metals to reduce friction.

Moreover, beads do not typically influence drilling fluid properties, except for a negligible increase in viscosity and possibly a slight decrease in 10 minute gel strength. Consequently, there is continued interest in new and better beads for use as drilling fluid lubricants, particularly in directional and horizontal wells.

SUMMARY OF THE INVENTION

Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

The present invention provides a drilling fluid lubricant, and a method of drilling well bores using that lubricant, which employs a novel and synergistic combination of lubricant beads to reduce the friction—the torque and drag—in the well bore occurring between the rotating drill string and the sides of the well bore and/or the well bore casing.

In the present invention, the focus is on lubricant beads having different specific gravities for lubrication at both the upper and lower points of contact in horizontal drilling. The beads preferably have a coating of dry lubricant and wetting agent to further improve performance and minimize static electricity. However, with preferred embodiments of the invention, such as for example blends of ceramic and polymer or copolymer beads, the combination of the beads in the blend itself synergistically results in the beads not exhibiting a static charge even without such coatings. The beads in such preferred blends also do not settle out in the package after blending.

According to the invention, the beads may be blended into any drilling fluid system to provide the system with a non-abrasive insoluble lubricant system that reduces torque and drag. The polymer beads used in preferred lubricants of the invention have a broader density range than has previously been commercially available resulting in a top to bottom lubrication of the drillstring in the extended reach or lateral drilling operation. The beads also do not show or develop problematic static charge in packaging or application when the ceramic type beads are blended with polymer or glass beads.

DESCRIPTION OF THE PREFERRED EMBODIMENTS

The present invention is directed to a method of drilling well bores in subterranean formations, particularly for the recovery of hydrocarbons, and to lubricants for use in drilling fluids employed in such drilling.

A drilling fluid or mud is a specially designed fluid that is circulated through a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts. Specific drilling fluid systems are selected to optimize a drilling operation in accordance with the characteristics of a particular geological formation. For example, the fluid is weighted as appropriate for the formation pressures and thinned as appropriate for the formation temperatures.

The drilling operations—whether drilling a vertical, directional, or horizontal borehole, conducting a sweep, or running casing and cementing—may generally be conducted as known to those skilled in the art with other drilling fluids. That is, a drilling fluid employing a lubricant of the invention is prepared or obtained and circulated through a well bore as the well bore is being drilled (or swept or cemented and cased) to facilitate the drilling operation. The drilling fluid provides the functions noted above of drilling fluids. The lubricant of the invention may be added to the drilling fluid before the drilling operation begins or at any time during the drilling operation.

Lubricant beads comprised of ceramic, glass, polymer, plastic and combinations thereof in drilling fluids are influenced by multiple physical and chemical processes, including product density, settling characteristics, sphere-icity, antistatic nature, reactivity, porosity, concentration and distribution in the drilling fluid. More particularly, blended ceramic beads and polymer beads neither affect, nor are they affected by, drilling fluid chemistry or composition. The effect of elevated temperatures and differential pressures that may commonly be encountered in drilling for hydrocarbons that may contribute to the deformation of plastic beads is attenuated by use of the blended beads. Certain polymer beads, such as for example ones comprised of styrene or polystyrene and divinyl benzene, may also be "heat tolerant," that is, tolerant of thermal temperatures encountered in drilling in subterranean formations for the recovery of hydrocarbons, temperatures as high as about 80° F. or 180° C. or more.

Ceramic beads tend to be heavier than glass, polymer or plastic beads, with a specific gravity of about 3.2. Polymer beads such as polystyrene copolymer beads typically have a specific gravity of about 1.0 or more precisely of about 1.04 to about 1.07.

Ceramic beads tend to be stronger or more crush resistant than glass, polymer or plastic beads. Solid glass beads may have strength comparable to or approaching ceramic beads, but hollow glass beads tend to be more easily crushed. For use in the present invention, a high crush resistance (at least about 2000 psi) is thought to be desirable, and preferred beads for use in the present invention may have a crush resistance of at least 10,000 psi (generally achievable with polymers, plastics and glass) or 15,000 psi (generally achievable with ceramics such as, for example without limitation, GSX-904-06 Ceramic Beads, available from Grinding & Sizing Company LLC in Lufkin, Tex. and Houston, Tex.) or even 25,000 psi or more (generally achievable with some ceramics and some polymers, such as, for example without limitation, GSX-902 Premium Poly Beads available from Grinding $ Sizing Company LLC in Lufkin, Tex. and Houston, Tex.).

According to the present invention, lubricant beads of differing densities are blended into one product also preferably containing dry lubricant and wetting agent. Dry lubricants include without limitation amorphous carbon, graphite, polytetrafluoroethylene, biopolymer and synthetic polymers. Wetting agents include without limitation polyhydric alcohols such as sorbitol and propylene glycol. Some low molecular weight polyols such as without limitation polyethylene and polypropylene glycols may alternatively be used. The beads may be treated individually with the lubricant and/or wetting agent prior to blending, or all can be combined together for blending in one operation. The wetting agent, and/or any other liquid additives, may be introduced in the blend of beads as a spray-on application with mixing in a mechanical mixer such as a tumbling mixer, ribbon mixer or other similar mixer.

In a preferred embodiment, ceramic beads are blended with polymer beads having differing densities such that the specific gravity ranges from about 1.04-3.2 g/cc. Preferred blend ratios range from about 50-75% ceramic beads to about 50-25% polymer beads. A typical screen analysis for this preferred blend provides beads sized such that about 10-15% are retained on 30 mesh, about 60-65% are retained on 40 mesh, and about 20-25% are retained on 60 mesh, with a crush strength preferably greater than about 15,000 psi. This preferred blend also unexpectedly exhibits no settling or substantially no settling after blending.

Other bead mixtures may alternatively be used. For example, without limitation, lubricants systems of the invention may comprise various mixtures of beads selected from the group of beads comprising sintered bauxite and other ceramic, glass, plastic and other polymer and copolymer beads, at ratios of about 1 to about 99%. Polymer and copolymer beads may be made with a large number of different compounds, but common examples without limitation for polymer beads for use in the present invention are styrene or polystyrene and divinyl benzene.

The goal in the blending of the differing beads, such as for example, ceramic beads with polymer beads, is to allow multi-point lubrication at the top and bottom of horizontal drilling applications or operations. After blending, the beads unexpectedly exhibit substantially less segregation. This synergistic characteristic of the bead blend of the present invention helps facilitate achievement of this lubrication goal.

The bead blend formulation is also developed to ease handling and reduce static electricity. As noted above, some beads such as for example ceramic beads are naturally conductive (or are made conductive by coating with a conductor such as for example graphite or a wetting agent) and do not exhibit static or cause static problems in packaging or applications, whereas some other beads such as for example polymer beads often do exhibit static. Synergism is obtained in the blends of the present invention such that when a conductive bead is blended with a bead tending to have static, the blend of the two types of beads does not exhibit static. The present invention includes such a method of preventing static or avoiding the effects of static with bead lubricants. That method entails mixing together a conductive bead with a bead that exhibits static to cause the blend not to exhibit static. The method can further include the step of mixing in with the blend or the beads a wetting agent and/or dry lubricant.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above, and each and every claim below, and its equivalents, are incorporated into the specification as an embodiment of the present invention. Thus, the claims are a further description and are an addition to the preferred embodiments of the present invention.

We claim:

1. A drilling fluid lubricant composition comprising a blend of beads having varying densities such that the beads provide lubricity at both the top and bottom portions of a horizontal drill string during horizontal, directional, or extended reach drilling wherein the beads have a crush strength at least as high as about 15,000 psi.

2. The drilling fluid lubricant of claim 1 wherein the densities range from about 1 to about 3.5 g/cc.

3. The drilling fluid lubricant of claim 1 wherein the blend of beads comprises at least two different type beads in a ratio ranging from about 1% to about 99%, wherein the beads are selected from the group consisting of ceramic, glass, polymer and copolymer beads.

4. A drilling fluid lubricant composition comprising an anti-static agent and a blend of beads having varying densities such that the beads provide lubricity at both the top and bottom portions of a horizontal drill string during horizontal, directional, or extended reach drilling.

5. A drilling fluid lubricant composition comprising a blend of beads having varying densities such that the beads provide lubricity at both the top and bottom portions of a horizontal drill string during horizontal, directional, or extended reach drilling wherein the blend is heat tolerant at temperatures as high as about 380° F.

6. A drilling fluid lubricant composition comprising a wetting agent and a blend of beads having varying densities such that the beads provide lubricity at both the top and bottom portions of a horizontal drill string during horizontal, directional, or extended reach drilling.

7. The drilling fluid of claim 6 wherein the wetting agent is selected from the group consisting of polyhydric alcohols, polyethylene glycols, and polypropylene glycols.

8. A drilling fluid lubricant composition comprising a blend of beads having varying densities such that the beads provide lubricity at both the top and bottom portions of a horizontal drill string during horizontal, directional, or extended reach drilling wherein the beads have a dry lubricant deposited thereon.

9. The drilling fluid of claim 8 wherein the dry lubricant is selected from the group consisting of amorphous carbon, graphite, polytetrafluoroethylene, biopolymers, and synthetic polymers.

10. A drilling fluid lubricant composition comprising a blend of beads having varying densities such that the beads provide lubricity at both the top and bottom portions of a horizontal drill string during ,horizontal directional, or extended reach drilling wherein the beads comprise polystyrene copolymer beads and ceramic beads and have a ratio of about 1-99% polystyrene copolymer beads to about 99-1% ceramic beads.

11. A drilling fluid lubricant composition comprising a blend of beads having varying densities such that the beads provide lubricity at both the top and bottom portions of a horizontal drill string during horizontal directional or extended reach drilling wherein the beads comprise polystyrene copolymer beads and ceramic beads and have a ratio of about 50-75% ceramic beads to about 50-25% polystyrene copolymer beads.

12. A drilling fluid lubricant composition comprising a blend of beads having varying densities such that the beads provide lubricity at both the top and bottom portions of a horizontal drill string during horizontal, directional, or extended reach drilling wherein the beads comprise polystyrene copolymer beads and ceramic beads and are sized such that about 0-15% are retained on 30 mesh, about 60-65% are retained on 40 mesh, and about 20-25% are retained on 60 mesh.

13. The drilling fluid of claim 12 wherein the beads have a crush strength greater than about 15,000 psi.

14. A method for drilling or cementing a directional, horizontal or extended reach wellbore with a drilling fluid having improved lubricity, the method comprises adding to the drilling fluid a blend of beads having varying densities such that the beads provide lubricity at both the top and bottom portions of a horizontal drill string during the directional, horizontal, or extended reach drilling, wherein the blend of beads comprises about 50-75% ceramic beads and about 25-50% copolymer beads, wherein the copolymer beads comprise styrene, polystyrene or divinyl benzene, wherein the blend of beads optionally has a wetting agent deposited thereon, and wherein the specific gravity of the blend of beads ranges from about 1.04 g/cc to about 3.2 g/cc.

15. The method of claim 14 wherein the blend of beads does not exhibit a static charge.

16. The method of claim 14 wherein the blend of beads does not exhibit settling.

17. The method of claim 14 wherein the blend provides beads sized such that about 10-15% are retained on 30 mesh, about 60-65% are retained on 40 mesh, and about 20-25% are retained on 60 mesh, and wherein the blend of beads has a crush strength of at least about 15,000 psi.

18. The method of claim 14 wherein the ceramic beads comprise sintered bauxite.

* * * * *

(12) EX PARTE REEXAMINATION CERTIFICATE (10311th)
United States Patent
Ruark et al.

(10) Number: US 8,324,136 C1
(45) Certificate Issued: Oct. 6, 2014

(54) SYNERGISTIC BEAD LUBRICANT AND METHODS FOR PROVIDING IMPROVED LUBRICATION TO DRILLING FLUIDS FOR HORIZONTAL DRILLING

(75) Inventors: Gregory A. Ruark, Mustang, OK (US); Robert W. Pike, Houston, TX (US)

(73) Assignee: Wilmington Trust, National Association, Minneapolis, MN (US)

Reexamination Request:
No. 90/012,870, May 31, 2013

Reexamination Certificate for:
Patent No.: 8,324,136
Issued: Dec. 4, 2012
Appl. No.: 12/930,420
Filed: Jan. 6, 2011

Related U.S. Application Data

(60) Provisional application No. 61/335,397, filed on Jan. 6, 2010.

(51) Int. Cl.
*C09K 8/05* (2006.01)

(52) U.S. Cl.
USPC ........... 507/117; 166/293; 507/136; 507/138; 507/140

(58) Field of Classification Search
None
See application file for complete search history.

(56) References Cited

To view the complete listing of prior art documents cited during the proceeding for Reexamination Control Number 90/012,870, please refer to the USPTO's public Patent Application Information Retrieval (PAIR) system under the Display References tab.

*Primary Examiner* — Alan Diamond

(57) ABSTRACT

A drilling fluid lubricant and method for drilling using same comprising a blend of beads having varying densities such that the beads provide lubricity at both the top and bottom portions of a horizontal drill string during horizontal, directional, or expanded extended reach drilling.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

\* \* \* \* \*